United States Patent [19]

Koch

[11] Patent Number: 5,030,129
[45] Date of Patent: Jul. 9, 1991

[54] MOUNTING FOR DATA COMMUNICATIONS UNITS

[75] Inventor: Siegfried Koch, Villingen-Schwenningen, Fed. Rep. of Germany

[73] Assignee: Mannesmann Kienzle GmbH

[21] Appl. No.: 410,097

[22] Filed: Sep. 20, 1989

[30] Foreign Application Priority Data

Sep. 20, 1988 [DE] Fed. Rep. of Germany ....... 3831829

[51] Int. Cl.⁵ ............................................ H01R 13/70
[52] U.S. Cl. .................................... 439/374; 439/568; 439/620
[58] Field of Search .......................... 248/222.4, 223.1; 439/374, 376, 545, 568, 571, 620

[56] References Cited

U.S. PATENT DOCUMENTS

| | | | |
|---|---|---|---|
| 2,088,320 | 7/1937 | De Vries | 248/223.1 X |
| 3,731,956 | 5/1973 | Hanley | 248/223.1 X |
| 4,012,686 | 3/1977 | Heine | 248/222.4 X |
| 4,761,823 | 8/1988 | Fier | 439/374 X |

FOREIGN PATENT DOCUMENTS

| | | |
|---|---|---|
| 3607114 | 10/1987 | Fed. Rep. of Germany . |
| 3616113 | 12/1987 | Fed. Rep. of Germany . |
| 2310063 | 11/1976 | France ................... 439/571 |

Primary Examiner—Eugene F. Desmond
Attorney, Agent, or Firm—Toren, McGeady & Associates

[57] ABSTRACT

A mounting or carrier for data communications units configured as hand-held units suitable for heavy duty in a motor vehicle, and which permits simple handling of the hand-held units and affords a high functional security as far as the line connection and attachment is concerned. A head pin or lug is mounted to a flange surface on the carrier or support, which engages a keyhole-like aperture in the hand-held unit. A flexibly supported guidance part projects from a console molded at the carrier and cooperates with a recess in the hand-held unit. The electrical line connection points of the carrier are shielded by the guidance part when no hand-held unit is present thereon, and the guidance part additionally functions for actuating a switch.

20 Claims, 7 Drawing Sheets

MOUNTING FOR DATA COMMUNICATIONS UNITS

The invention is directed to a mounting for data communication units, which are designed as hand-held units or manually operated units adapted to the mounting and are intended for data transmission between a data processing installation and one or several sources of data with electrical line connection points assigned to the data communications units.

BACKGROUND OF THE INVENTION

Data communications units, designated as hand-held units, are already in wide use, and actually in the form of easily handled units, especially also operable while being held in the hand for decentralized, digital data acquisition and for data transmission between mostly several sources of data and a central data processing installation. They are also in a limited task-oriented extent also used for data processing on the spot and for control by the user.

In the simplest case, data cassettes are used for the data transmission involved. In a higher development stage, a numerical and instruction keyboard, a display, means or use of a barcode hand-held reader as well as suitable print-out devices can be provided; this means that such equipment is conceived as mini-computers provided with suitable interfaces and a rechargeable current supply.

A preferred application area for such hand-held units is a commercial vehicle or a motor vehicle fleet, where vehicle operational and travel data are to be acquired for immediate decisions, for instance maintenance measures, as well as for later tour planning as where the drivers are optimally guided or at least informed by tour plans prepared in a stationary data processing installation.

Indubitably the efficiency of the vehicle use, for instance in commercial freight traffic, can be considerably increased by the application of such a system. A wider application has hitherto however been prevented not by an insufficient acceptance of the electronic data processing system in itself, rather by the units to be handled, part of which were relatively heavy as well as of large volume because of the functions assigned to them.

The shaping of such hand-held units so as to be easily gripped and held in the hand with an appropriate weight distribution and rounding-off of edges is decisive for their acceptance, but also an easily monitored operability and readability of the information to be displayed.

Other criteria are however significant for use in a motor vehicle, namely: a hand-held unit should be mounted in the driver's cab so as to be within easy reach of the driver; it must be attachable so as to be shake-proof; and the attachment or the mounting of the hand-held unit must be adapted to the rough working environment in the motor vehicle. This means that the attachment of the hand-held unit and the contact provisions or the coupling of the hand-held unit with the power and data lines in the vehicle, by means of which the hand-held unit must be connectible with measured value or static transmitters as well as other vehicle instruments or with a vehicle databus, must be performable without any undue care being required or without the user having to look in the direction of this equipment and without being subject to damage.

It can be easily seen that cable and plug-in connections cannot be used in this environment. Furthermore, for hand-held units which have to have a fixed seating on a suitable support, and have to be inserted into guides, for instance into a dovetailed guide, such guides have to be avoided, because with the latter an exact alignment is required in order to avoid tilting. In addition, pocket-shaped or trough-shaped receptacles for hand-held units are unsuitable, since in these cases access is limited.

SUMMARY OF INVENTION

Thus, an object of the invention is a receptacle or holder for mobile data communications units especially suitable for rugged operation, which holder permits an explicit and simple handling of the hand-held units and provides a high functional security as far as the electrical or data line interconnection and fastening is concerned.

In accordance with one aspect of the invention, a support carrier is provided with an essentially flat flange face or outer surface configured as a carrier for support, and a console projecting from the carrier is assigned to the flange face. Bayonet connection means for the hand-held units to be retained are provided at the carrier in the region of the flange face and a guidance part extending parallel to the flange surface and entering into effective connection with the hand-held units to be retained is assigned to the console.

The invention assures with simple means a sound shake-proof connection, by providing a pressure region and intuitively secure positioning, thus a secure alignment connection between stationary power and data lines and those in the portable or mobile equipment. The care required for positioning is largely minimized, because the hand-held units are first of all placed against the flange surface, providing an automatic centering by a preferably hemispherical enlarged head lug, and then the units must be merely pulled or pushed against the console forming a stable stop which protects the bayonet connection elements from damage. This movement is as a rule directed downwards or away from the user, meaning that the motion sequence during stationary attachment of a hand-held unit is optimized also as far as ergonomics are concerned, and the hand-held units can be accessed securely at two front faces.

In view of a possible careless handling of the hand-held units, it is furthermore of advantage that they can also be placed at a certain angle to an end position upon the flange surface and can then be pivoted by turning into the correct bayonet engagement position. This is accomplished by suitable shaping of the guide portion and/or of the slot assigned to the guide portion or of a depression on the front side of the hand-held unit. Naturally several bayonet connections can be provided; however the above-mentioned advantage then is no longer available.

Another advantage of the invention is that the guide portion, acting so-to-speak as a downwards retention means, creates defined coupling spacings for the case that the electrical line interconnections are arranged in the region of the portion of the guide part projecting from the console. The guide portion can be designed on the one hand in such a way in one flexible embodiment form, that it covers the power and data line connection points in the unactuated state securely against entry of dirt and moisture. On the other hand, it serves as an actuation element for switching, for instance, the power supply for changing or operating the hand-held unit when stored in its receptacle. The switching process concerned can additionally be utilized in order to display the correct seating of the hand unit, for instance by means of a light-emitting diode or other display. The guide part includes the three above-described functions in the preferred embodiment. A simpler embodiment requires only the attachment function with a rib or a rack fixedly molded at the console.

The invention permits furthermore the retention of hand-held units of different widths and different heights, so-to-speak retention of a whole family of units, and can also be utilized in such a way that the stationary retention elements are configured directly at a wall forming the flange surface as well as being assigned to a carrier. It can be placed on a wall or can be attached so as to be embedded in such a way with the use of suitable brackets that the flange surface terminates, for instance, flush with the wall. In addition it is worth noting that the inventive retention means enables an advantageous shaping for gripping of the hand-held units especially as far as their rear side is concerned.

SUMMARY OF DRAWINGS

In the following description, exemplary embodiments of the invention are described with particularity with the help of the attached drawings, wherein.

DETAILED DESCRIPTION OF PREFERRED EMBODIMENTS

Figure 1:
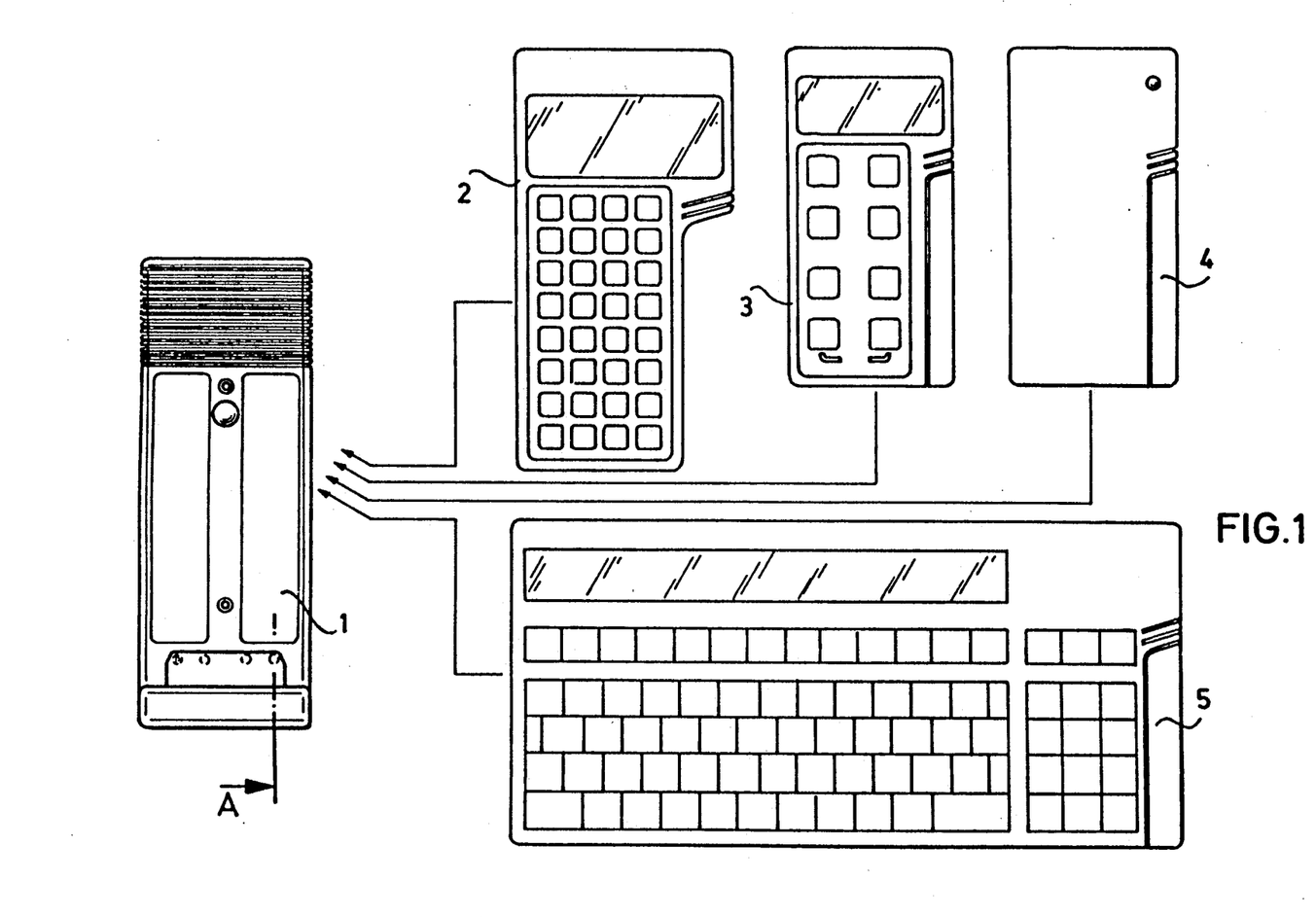
FIG. 1 combines a front view of a carrier or support in accordance with the invention and front views of different hand-held units assignable to the carrier.

The diagrammatic layout in FIG. 1 shows a mounting, which provides as an autonomous unit a carrier or support with an essentially rectangularly configured housing 1. Various data communications hand-held units 2-5 are assigned to the mounting, and which can be selectively connected with the mounting. A hand-held unit designated 2 permits for instance to scan and display data stored in the hand-held unit, and which also permits to display and/or store data which have been put in by hand or acquired from the vehicle. The hand-held unit 3 serves, as its keyboard indicates, as a work time information equipment for one of the drivers during motor vehicle operation. A cassette, designated 4, which as a memory serves exclusively for data transmittal, and 5 designates a hand-held unit which provides input functions expanded into an alpha-numerical keyboard.

Figures 2, 3:
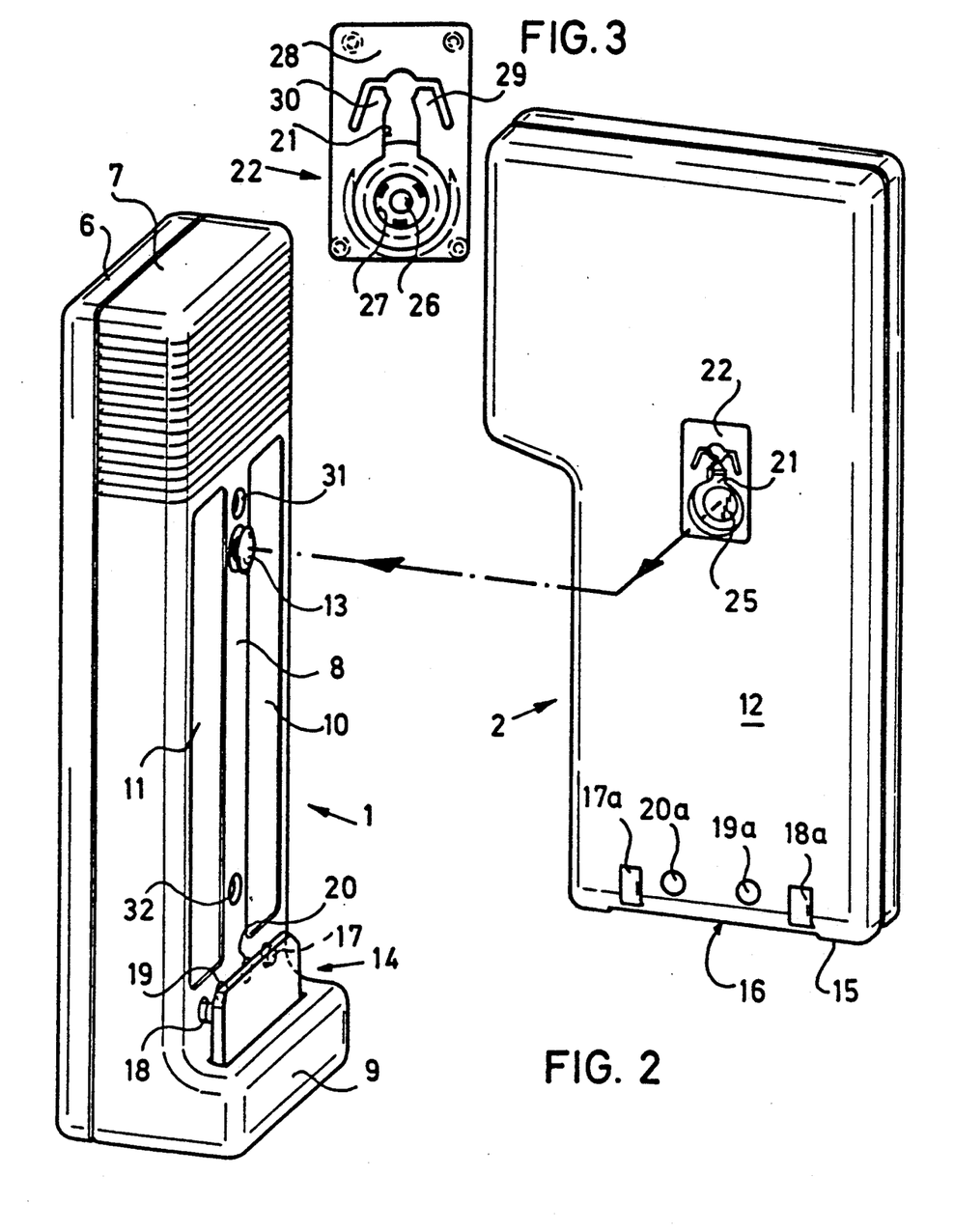
FIG. 2 is a perspective view of the carrier shown in FIG. 1 with a hand-held unit ready to be attached at the carrier.
FIG. 3 is a plan view of the insert part embedded into the rear wall of the hand-held unit of FIG. 2.

The housing 1 of the carrier or support is assembled according to FIG. 2 from two housing shells 6 and 7, and provided with a flanged or projecting face or surface 8 and a console 9 configured as a housing shelf whose one wall constitutes the front side of the housing 1. Numerals 10 and 11 designate depressions, which allow improved contacts of the rear wall 12 of the hand-held unit 2 with the flanged surface 8, which rear wall 12 is designed to be completely flat except for apertures for the bayonet connection means chosen. It can additionally be seen from FIG. 2 that a tip or head lug 13 fastened at the front wall of the housing shell 7 includes a hemispherically-shaped enlarged head end facilitating the centering of the hand-held unit when applied to the flanged surface 8. A guidance or guide part 14 projecting in a plate-shaped manner out of the console 9 and extending essentially parallel to the plane surface 8 serves furthermore for the mounting of the hand-held units. The guidance part 14 is supported flexibly in the housing shell 7 in a suitable manner which will be described below and it engages with the hand-held unit 2 when mounted in the carrier via a pocket or slot-shaped recess 16 molded into an end wall 15 of the hand-held unit 2. The end wall 15 can also be designed to be stepped or provided with a salient. The pocket-shaped recess or the salient on the front has the advantage that a mounted hand-held unit is secured also against twisting around the lug 13 and thus the mounting can be attached in such a way that the hand-held unit can also be fastened upright or up-ended.

The guidance part 14 screens or shields, when no hand-held unit is mounted, spring-loaded electrical contacts 17 and 18 projecting from the flange surface 8 as well as the separation point of two light conduits or connectors closed with windows 19 and 20 preferably so as to be flush with the flange surface. Flat electrical contact 17a and 18a are assigned to the contacts 17 and 18 which serve for the power supply of the mounted hand-held units. The light conduits which serve for data transmittal are closed off by windows 19a and 20a in the hand-held units. Data transmittal for instance by infrared light is selected in this context for the reason that they are independent of distance and shock within relatively wide limits.

A keyhole-like, at least partially undercut, aperture 21 in the hand-held unit is configured to receive the tip lug 13 as the matching piece of the bayonet connection, which aperture is configured in a partially pot-shaped insertion part 22. A depression 23 (FIG. 5) in the rear wall of the hand-held unit 2 is assigned to the insertion part, whose magnified plan view is depicted in FIG. 3; the insertion part is insertable into said depression and attachable therein by a screw 24.

Figure 4:
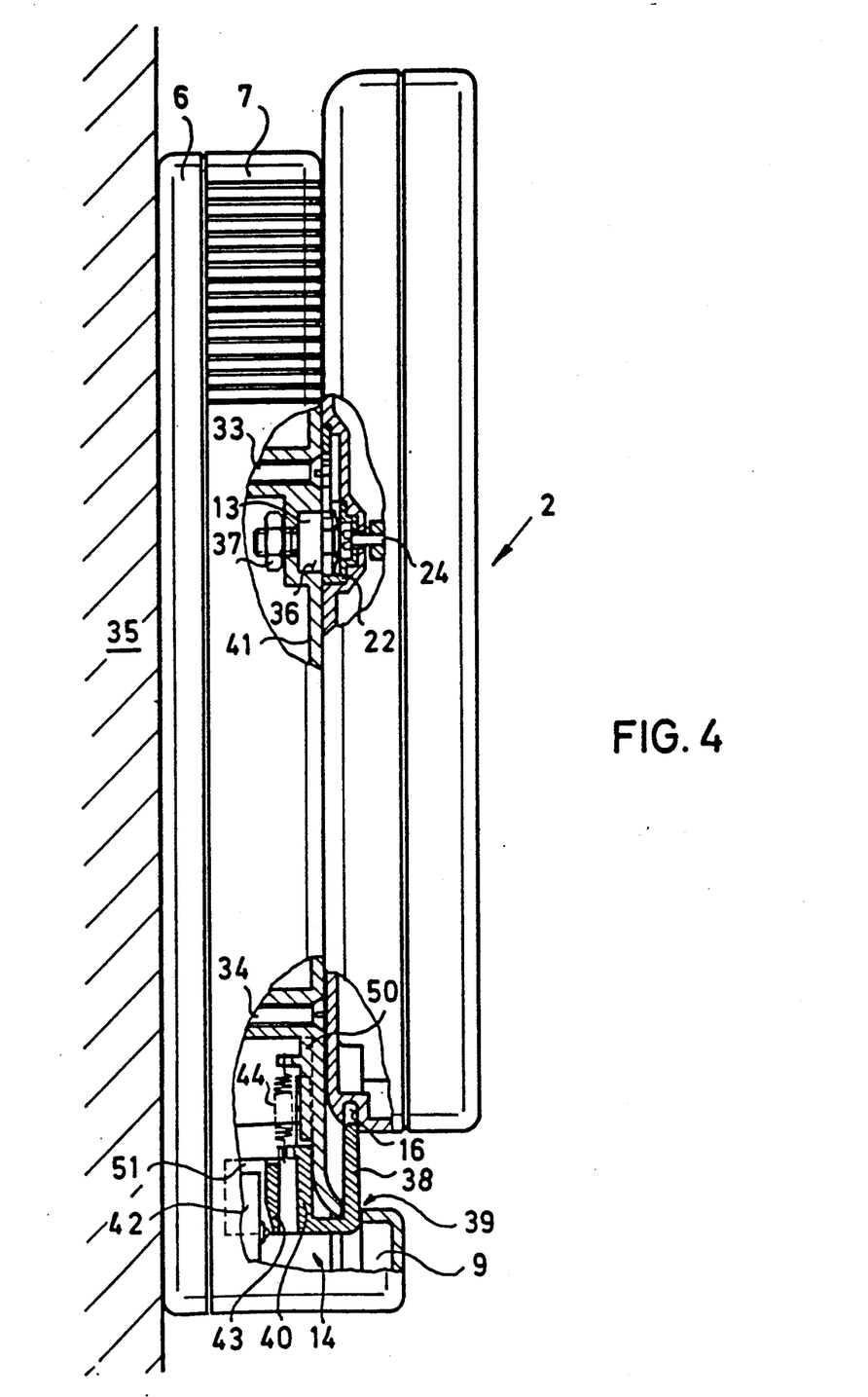
FIG. 4 is a side view with partial sections of the carrier of FIG. 1 and of the hand-held unit in an intermediate state during its placement on or removal from the carrier.

As FIG. 4 shows, the screw 24 with an associated lead seal 25 (FIG. 5) serves simultaneously for bolting together the housing of the hand-held unit 2 formed out of the two housing shells. As can be discerned from FIG. 3, a throughbore 26 with a cylindrical countersink 27 is configured in the insertion part 22 for attachment of the screw 24 and the lead seal 25. Furthermore, the slotted walls of the keyhole-like aperture 21 configured in the front plate 28 of the insertion part 22 are formed by suitable undercutting of flexible ledges 29 and 30. The ledges 29 and 30 are shaped in such a way that they form on the one hand a narrowing of the slot which is not designated here and form the mounting or a socket in the bottom of the slot corresponding to the shaft diameter of the tip lug 13. Apertures are designated with 31 and 32 (FIG. 2) which serve for passing screws 33 and 34 through them as is shown in FIG. 4, by means of which screws the housing 1 can for instance be attached to a wall 35. The non-depicted cable or cables for the transmitter and data lines as well as of the power supply are preferably led into the rear wall of the carrier or support; they are however also coupleable at a side wall especially the lower side with the carrier or support in case said carrier or support is installed on a wall.

FIG. 4 shows a hand-held unit 2 placed against the flange 8 at the carrier but not yet in its end position in the bayonet connection, but with the tip lug 38 inserted into a countersink 36 in the front wall of the housing shell 7 and is fastened there by means of a nut 37. Furthermore, FIG. 4 shows that a ramp 43 assigned to a switch 42 is molded at the guidance part 14, which grips with a plate-shaped latching bolt 38 molded at said guidance part outwards through a slot-shaped aperture 39 in the console 9 and which embraces the front wall 41 of the housing shell 7 with a web 40 serving for stabilization. A spring 44 assigned to the guidance part 14 retains the guidance part 14 in the position shown in FIGS. 2 and 4 when no hand-held unit is present.

Figure 5:
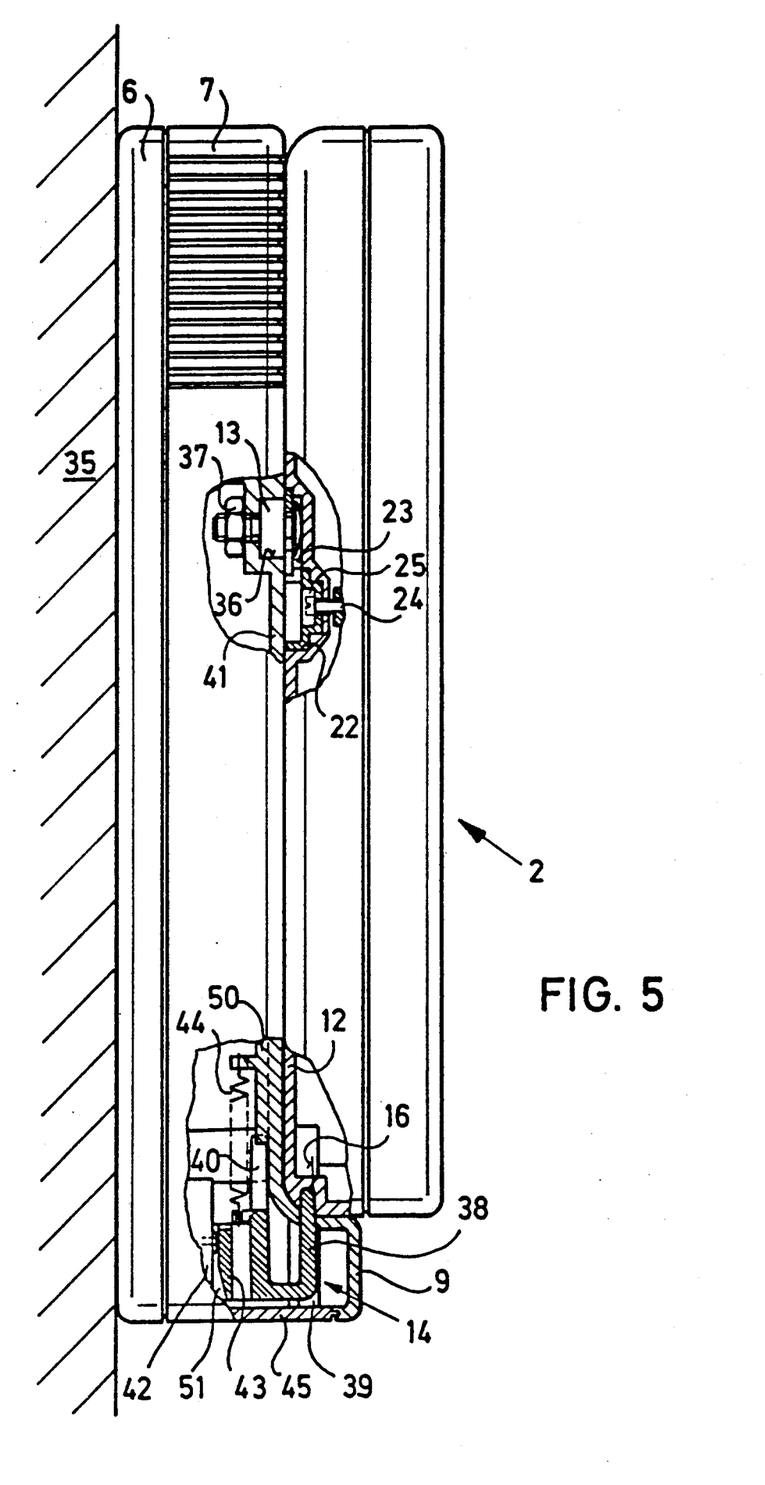
FIG. 5 is a side view similar to FIG. 4 showing final placement of the hand-held unit on the carrier.

FIG. 5 shows the hand-held unit 2 pushed downward into engagement with its bayonet lock and thus fastened at the carrier. On the one hand, the housing shell 7 is hollowed out in such a way and, on the other hand, the housing shell 6 is provided with such a wall portion 45 that the guidance part 14 can be easily installed prior to assembling the two housing parts 6 and 7.

Figure 6:
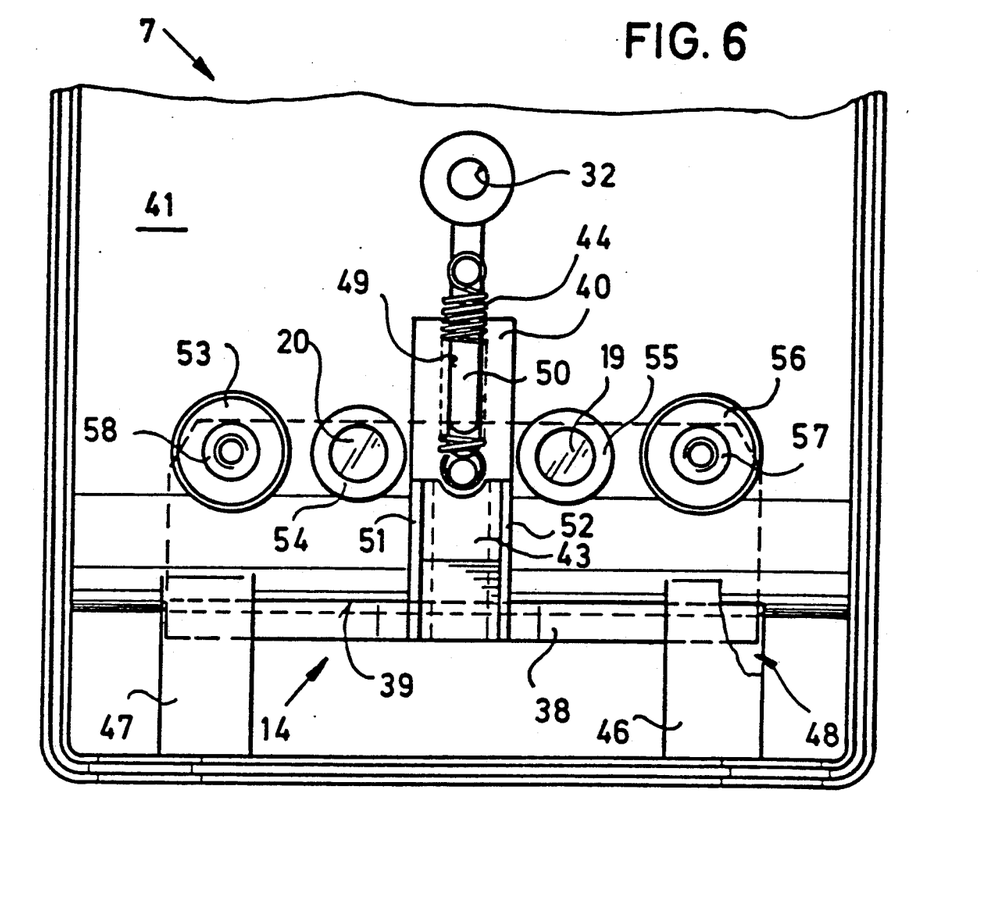
FIG. 6 is a partial rear view of the front wall of the carrier.
Figure 9:
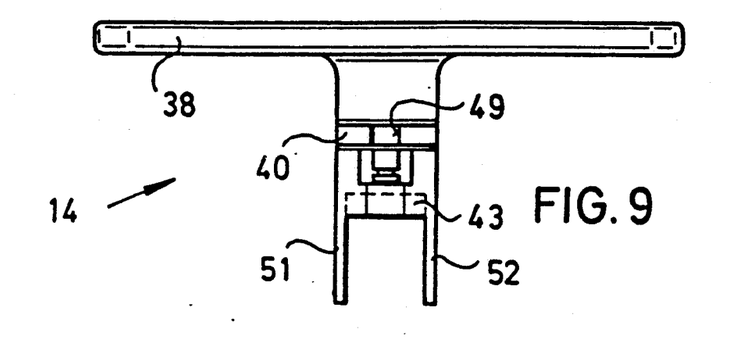
FIG. 9 is a plan view of a guide part as it is depicted in FIGS. 2, 4 and 6 and in other diagrams.

The rear view of the front wall 41 of the carrier (FIG. 6) makes it clear that the latch 38 of the guidance part 14 is guided in guide slots 48 formed within the console 9 through shaping of the intermediate walls 46 and 47. The web 40 fulfills also a guidance function in connection with a rib 50 configured at the front wall 41 by means of a slot 49. The ramp 43 configured at the web 40 is equipped with cheeks 51 and 52 in order to achieve a reliable assignment of the guide portion 14 to the switch 42. A plan view of the guidance part 14 alone is depicted in FIG. 9 which is meant to additionally clarify the design of the guidance part 14.

Tubularly-shaped extensions 53, 54, 55 and 56 pointing inwards are molded at the front wall 41, of which 54 and 55 form the light conduits and 53 and 56 are intended for receiving of threaded bolts 57 and 58. According to the partial section in FIG. 7, the threaded bolts 57, 58 serve on the one hand for the mechanical connection of the housing shells 6 and 7 by means of screws 59, with a printed circuit board 60 assigned to the housing 1 clamped between the threaded extension and spacers 61 molded at the housing shell 6. On the other hand, the electrical connection for the pin-shaped electrical contacts 17 and 18 assigned to the threaded bolts 57 and 58 is achieved by means of the threaded bolts 57 and 58 when they are in connection with the printed circuit board 60. The contact pins 17 and 18 are respectively guided in a sleeve 62 which can be pressed into the threaded bolts 57 and 58, which sleeve additionally serves for receiving a compression spring 63. Lead seals assigned to the screws 59 are designated with 64.

As will be clear from the foregoing description, the user need merely press the flat back of the hand-held unit against the reference surface 8, engaging the lug 13 with the keyhole opening 21 and the recess 16 by the wall part 38, as shown in FIG. 4, and then pushes downward. When the hand-held unit stops in the position shown in FIG. 5 by the hand-held unit bottom hitting the horizontal portion of part 9, the part 38 has moved downward and the ramp or cam 43 has actuated the switch 42. In this latched position, the spring contacts 17a, 18a in the hand-held unit make electrical contact with the contacts 17, 18 on the carrier, and the optical lines 19a, 20a are aligned with their counterparts 19, 20 in the carrier for data transmission. The mechanical connection is secure due to the keyhole narrowing part engaging the lug shaft behind its head. The reverse operation allows removal of the hand-held unit, which also deactivates the electrical switch.

Figure 7:
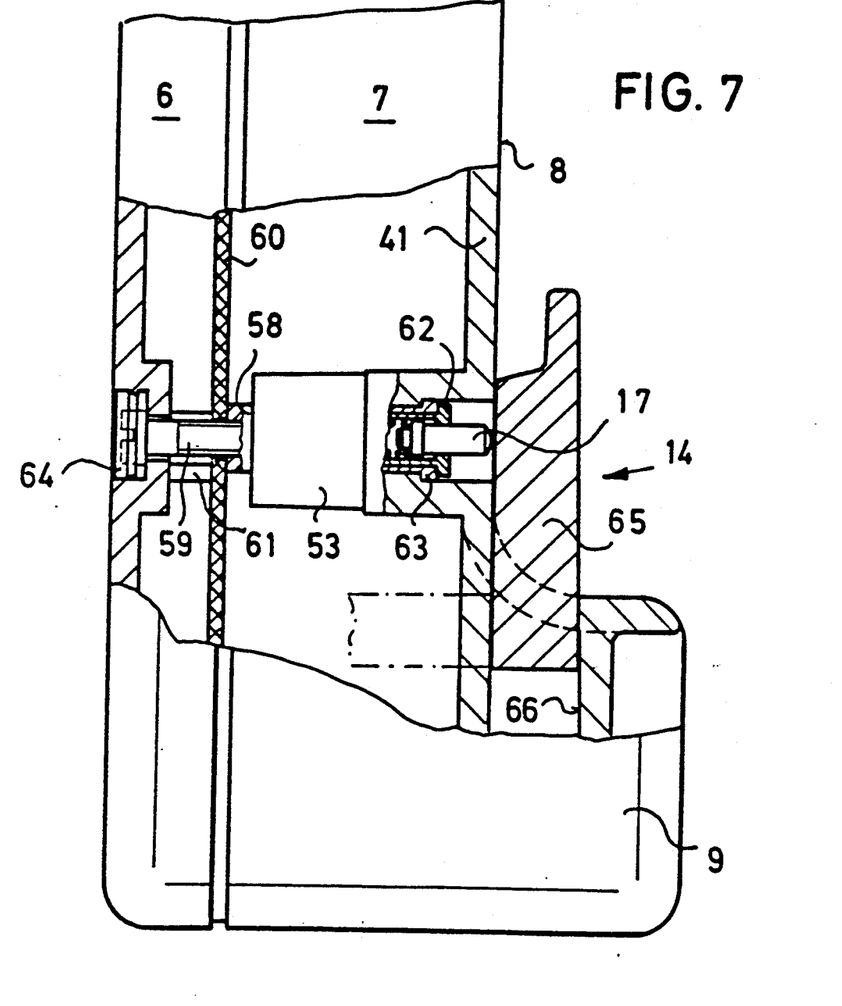
FIG. 7 is a partial section of the carrier along the line A in FIG. 1, also showing a variation of the guide part supported in the carrier.

The embodiment in FIG. 7 also shows a variation in which the guidance part 14 can also be designed and guided in direct contact with the flanged surface 8, and thus performs a wipe-off or cleaning function for the line contact points. It also shows a correspondingly designed and possibly fiber-covered plate 65 providing an aperture in console 9 which has been widened in an appropriate manner, as well as appropriate guidance slots 66.

Figure 8:
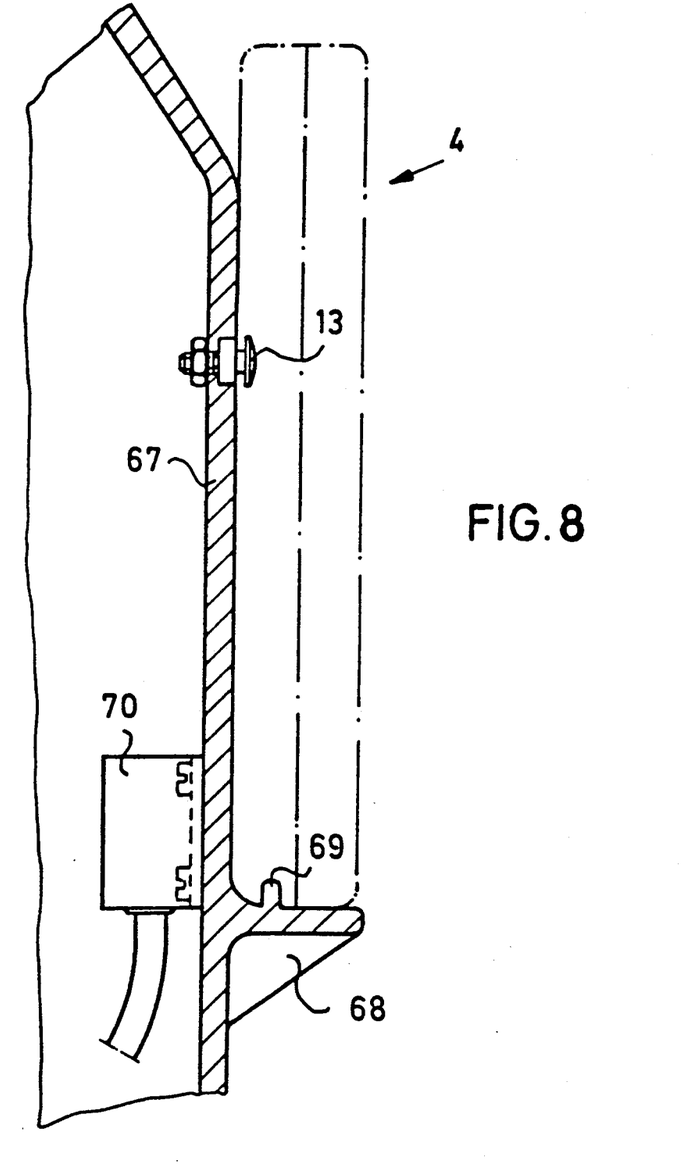
FIG. 8 is a sectional view showing another embodiment of retention elements assigned to a stationary carrier.

FIG. 8 shows another embodiment in which the retaining element or carrier is assigned directly to a pannelling or cowling portion 67 of a motor vehicle, for example, a dashboard. Herein, a console 68 with a stationary rib 69 being molded onto it as a guidance part can be fastened at the pannelling part 67 or can be molded directly thereon. The pin lug 13 is embedded in this case in the already described manner into the pannelling part 67. Furthermore, a line support 70 is attached to the pannelling part 67, in which the spring-loaded contacts 17 and 18 as well as a photo-electric converter for the data line and their optical transmission means is arranged. In this case where the support carries merely the attachment or the retaining element and serves as a line distributor, the construction blocks for the interface adaptation and the voltage supply are installed in another location in the vehicle, which for instance is more accessible for maintenance purposes, or they are installed in a computer assigned to the system.

While the invention has been described in connection with preferred embodiments, it will be understood that modifications thereof within the principles outlined above will be evident to those skilled in the art and thus the invention is not limited to the preferred embodiments but is intended to encompass such modifications.

I claim:

1. A mounting for data communications units configured as hand-held units for data communication with a data processing installation and with electrical connections on the hand-held units, said mounting comprising:
   a carrier having a substantially flat surface and a projecting support part,
   a detachable connection for the hand-held units at the region of the flat surface,
   a guidance part mounted to the projecting support part and extending parallel to the flat surface for engagement with the hand-held units,
   said projecting part being configured as a forwardly-extending shelf, the guidance part being mounted in the shelf for vertical movement therein.

2. The mounting of claim 1, further comprising means for mounting said carrier onto a wall portion of a motor vehicle.

3. A mounting for data communications units configured as hand-held units for data communication with a data processing installation and with electrical connections on the hand-held units, said mounting comprising:
- a carrier having a substantially flat surface and a projecting support part,
- a detachable connection for the hand-held units at the region of the flat surface,
- a guidance part mounted to the projecting support part and extending parallel to the flat surface for engagement with the hand-held units,
- said carrier being configured as an essentially rectangular housing,
- data transmission and power connection means mounted on the flat surface on the carrier.

4. The mounting of claim 3, wherein the data transmission and power connection means are mounted behind and are shielded by the guidance part.

5. A mounting for data communications units configured as hand-held units for data communication with a data processing installation and with electrical connections on the hand-held units, said mounting comprising:
- a carrier having a substantially flat surface and a projecting support part,
- a detachable connection for the hand-held units at the region of the flat surface,
- a guidance part mounted to the projecting support part and extending parallel to the flat surface for engagement with the hand-held units,
- said carrier being configured as an essentially rectangular housing,
- said guidance part being mounted to be displaceable in the carrier, said guidance part projecting from the console as a plate-shaped latch.

6. The mounting of claim 5, further comprising a power switch mounted in the carrier for actuation by the guidance part.

7. A mounting for data communications units configured as hand-held units for data communication with a data processing installation and with electrical connections on the hand-held units, said mounting comprising:
- a carrier having a substantially flat surface, upper and lower ends, and a projecting support part at its lower end,
- a detachable connection for the hand-held units at the region of the flat surface,
- a guidance part mounted to the projecting support part and extending parallel to the flat surface for engagement with the hand-held units,
- data transmission and power connection means mounted on the flat surface on the carrier.

8. The mounting of claim 7, wherein the data transmission and power connection means are mounted behind and are shielded by the guidance part.

9. The mounting of claim 7, wherein the detachable connection means comprises bayonet connection means having an enlarged headed lug.

10. The mounting of claim 9, wherein the head of the lug is hemispherically configured.

11. Data communication means comprising:
- a hand-held unit having data connections and power connections, and a mounting support for the hand-held unit also having data connections and power connections;
- said mounting support comprising an essentially flat outer surface, a shelf support projecting forwardly from the carrier, a bayonet-type connection provided at the region of the flat surface, a guidance part extending from the shelf surface parallel to the flat surface;
- said hand-held unit comprising an aperture for engaging the bayonet connection on the carrier and a recess for receiving the guidance part, whereby when the hand-held unit is placed on the mounting support with the aperture engaging the bayonet connection and with the guidance part engaging the recess, communication and electrical contact is established between the corresponding and respective data and power connections of the hand-held unit and mounting support.

12. Data communication means as claimed in claim 11, wherein the data and power connections are arranged behind the guidance part.

13. Data communication means as claimed in claim 11, wherein the guidance part comprises a plate-shaped latch mounted to be displaceable in the carrier and configured to engage the recess in the hand-held unit.

14. Data communication means as claimed in claim 11, further comprising a switch in the carrier and connected to its power connections and mounted so as to be actuable when the guidance part is displaced upon engagement by the hand-held unit.

15. Data communication means as claimed in claim 11, wherein the bayonet connection means comprises an enlarged headed lug on the said carrier surface, and the hand-held unit aperture has a keyhole-like shape.

16. Data communication means as claimed in claim 15, wherein the keyhole-shaped aperture is formed by flexible fingers.

17. Data communication means as claimed in claim 13, wherein the plate-shaped latch is spring-loaded toward an up position wherein it extends over the data and power connections, said latch being displaceable to a down position when the hand-held unit engages the bayonet connection and the latch and is pushed downwardly.

18. Data communication means as claimed in claim 17, further comprising a switch in the carrier positioned to be activated when the latch is moved to its down position.

19. Data communication means as claimed in claim 13, wherein the power connections in the carrier are spring-loaded.

20. Data communication means as claimed in claim 11, wherein the hand-held unit contains a keyboard and display.

* * * * *